April 5, 1960 H. M. ERWIN 2,931,262
TOOL FOR CUTTING CIRCULAR GROOVES
Filed Jan. 8, 1957 3 Sheets-Sheet 1
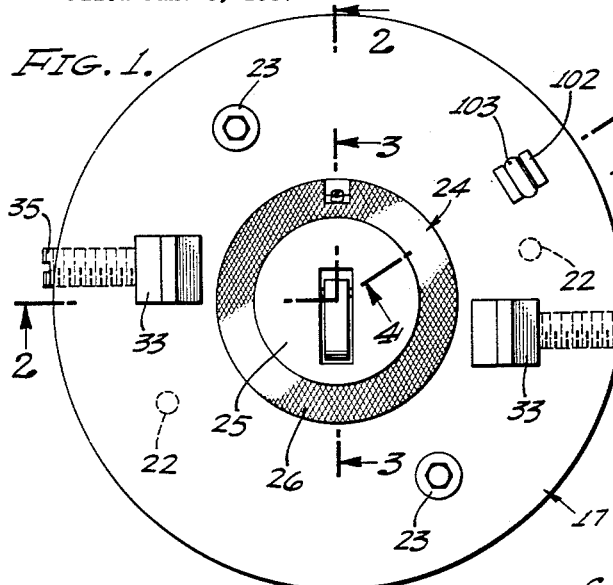
FIG. 1.
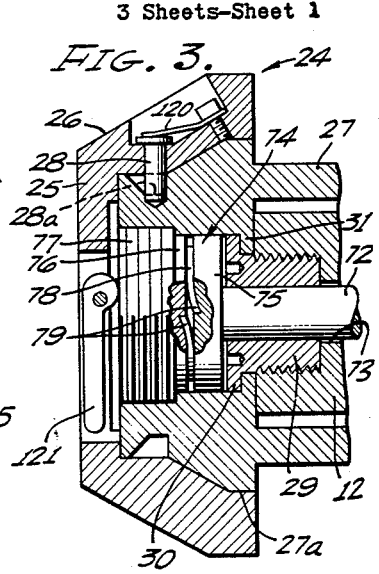
FIG. 3.
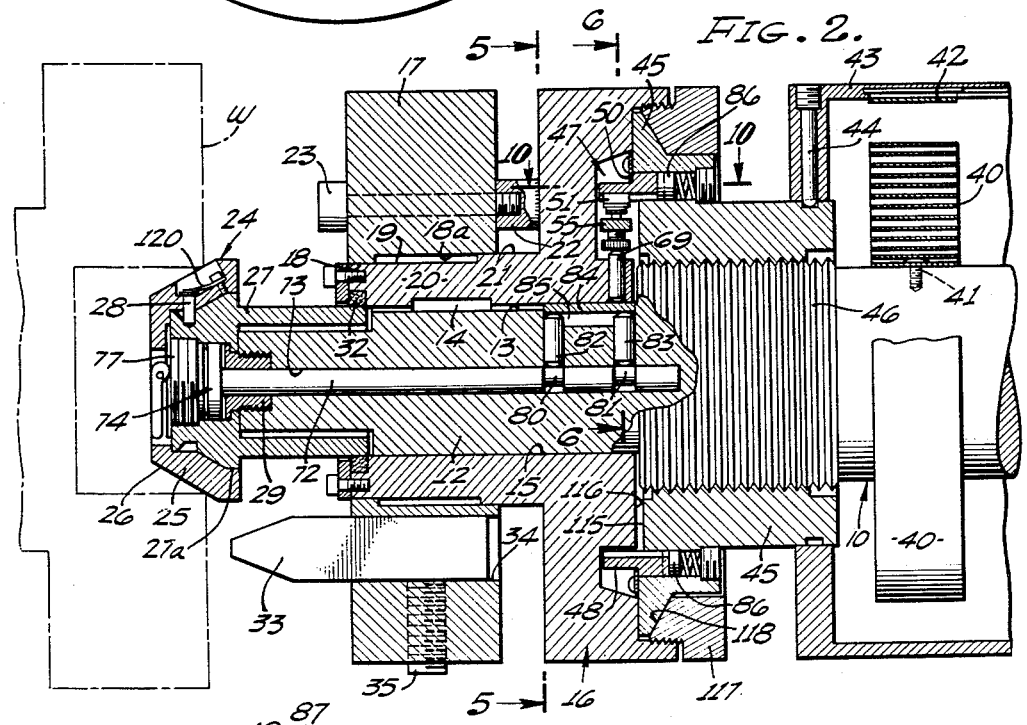
FIG. 2.
FIG. 10.
HARRY M. ERWIN
INVENTOR.
BY Lyon & Lyon
ATTORNEYS April 5, 1960

H. M. ERWIN 2,931,262

TOOL FOR CUTTING CIRCULAR GROOVES

Filed Jan. 8, 1957

HARRY M. ERWIN
INVENTOR.

BY Lyon & Lyon
ATTORNEYS

April 5, 1960 H. M. ERWIN 2,931,262
TOOL FOR CUTTING CIRCULAR GROOVES
Filed Jan. 8, 1957 3 Sheets-Sheet 3

HARRY M. ERWIN
INVENTOR.

BY
ATTORNEYS

United States Patent Office 2,931,262
Patented Apr. 5, 1960

2,931,262

TOOL FOR CUTTING CIRCULAR GROOVES

Harry M. Erwin, Fullerton, Calif.

Application January 8, 1957, Serial No. 633,000

8 Claims. (Cl. 82—2)

This invention relates to apparatus for cutting circular grooves and is particularly adapted for use with machine tools such as, for example, lathes or drill presses. Apparatus of this type is particularly useful in cutting one or more circular grooves in the face of the flange. For example, flanged connections for piping installations often employ circular metal seal rings which are received in circular grooves provided in opposed side faces of the flanges.

It is an important object of my invention to provide a groove cutting tool assembly of the type described which substantially eliminates chatter while making it possible to do a maximum amount of work in a minimum amount of time. Another object is to provide such a device having a rotary tapered center element and having a bit-carrying ring element which may be detached from the assembly and disassembled therefrom without requiring disassembly of the center element, and without requiring that the cutting bits be removed from the ring element. This makes it possible to substitute bit carrying ring elements quickly and efficiently, and thereby materially speeds up the process of cutting different diameter grooves in different size flanges.

Another object is to provide a novel form of tool assembly for cutting circular grooves the assembly incorporating any one of several novel means for advancing the cutting bit into the work. A more particular object is to provide a device of this type wherein power means is provided for feeding of the cutting bits and wherein rotary motion of the work turns the rotating center element to drive an escapement mechanism controlling the rate of feed. Another object is to provide a novel form of escapement mechanism for such device.

Other objects and advantages will appear hereinafter.

In the drawings:

Figure 1 is a front elevation showing a preferred embodiment of my invention.

Figure 2 is a sectional view taken substantially along the lines 2—2 as shown in Figure 1.

Figure 3 is a sectional elevation partly broken away taken substantially on the lines 3—3 as shown in Figure 1.

Figure 10 is a sectional view partly broken away taken substantially on the lines 10—10 as shown in Figure 2.

Figure 5:
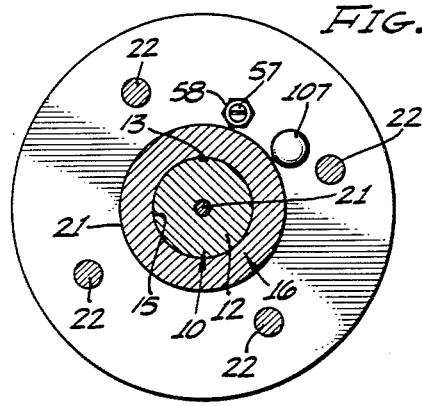
Figure 5 is a transverse sectional view taken substantially on the lines 5—5 as shown in Figure 2.

Referring to that form of the invention shown in Figures 1–11 of the drawings, the shank 10 has a tapered portion 11 for reception within the tail stock of a lathe or the spindle of a drill press. The forward end 12 of the shank 10 has an axial slot or keyway 13 for sliding reception of the key 14. The key is carried within the bore 15 of the annular feed collar 16. This collar 16 is slidably mounted on the outer surface of the shank portion 12.

A tool-carrying ring 17 is detachably mounted on the collar 16. The bore 18 rests on the cylindrical surface 19 of the hub 20, and the bore 18a rests on the cylindrical surface 21. Four internally threaded bosses 22 are welded or otherwise attached to the collar 16 and two of these receive a threaded fastening 23 which extends axially through the ring 17. The fastenings 23 serve to clamp the ring against the outer end of the bosses 22.

The forward end of the shank portion 12 carries a live center assembly generally designated 24. As best shown in Figure 3, this assembly 24 includes a rotary element 25 having a frustro-conical surface 26 which is adapted to engage a work piece. The surface 26 is preferably serrated or otherwise roughened. The element 25 is mounted on the sleeve 27 and is connected in driving relationship therewith by means of a radial pin 28 fitted in a radial socket formed in an annular groove 28a. A bushing 29 which is threaded into the forward end of the shank portion 12 is provided with a radial flange 30. An annular lip 31 on the sleeve 27 is confined between the flange 30 and the extreme forward end of the shank portion 12. The lip 31 has running clearance with respect to the bushing 29 and flange 30. A resilient seal ring 32 on the collar 16 engages the outer surface of the rearward end of the sleeve 27 for the purpose of excluding foreign matter and confining lubricant. From the above description, it will be understood that when the tapered portion 11 of the shank 10 is mounted in the tail stock of the lathe and the center element 25 is brought into engagement with a work piece "W" as shown in Figure 2, that rotation of the work piece serves to turn the center element 25 and sleeve 27 with respect to the collar 16 and ring 17.

A plurality of cutting bits 33 are mounted in apertures 34 provided on the ring 17 and the cutting bits are held in place by means of set screw 35. The minimum diameter bore 18 on the ring 17 is larger than the maximum outer diameter 27a of the sleeve 27 so that the ring 17 together with its cutting bits 33 may be removed axially over the sleeve 27 upon release of the threaded fastenings 23, without requiring removal of the live center assembly 24, other than quick removal of the element 25. This is a valuable feature since it enables substitution of rings 17 with their particular cutting bits in place.

Means are provided for automatically feeding the cutter bits axially into the work "W" for each revolution of the live center assembly 24 with respect to the shank 10. As shown in the drawings, this means includes the energy storage device or clock motor spring 40 which has one end fixed to the shank 10 by means of the threaded fastening 41 and which has the other end 42 suitably attached to the drive shell 43. A radial pin 44 serves to connect the drive shell 43 in driving relationship with the feed nut 45. This nut is mounted to turn on threads 46 provided on the shank 10. The action of the torsion spring 40 is to apply torque to the nut 45 to cause it to advance on the threads 46 in an axial direction toward the work piece "W."

An escapement movement generally designated 47 is provided for regulating the rate at which the feed nut 45 may turn on the shank 10. This escapement movement includes a ratchet ring 48 having axially extending ratchet teeth 49. The ratchet ring is loosely mounted upon the feed nut 45 and held in position by means of retainer ring 50. A pair of reciprocating pawls 51 and 52 are provided for alternately engaging the ratchet teeth 49. The pawl 51 is carried on a radial post 53 and the pawl 52 is carried on a radial post 54. Post 53 is slidably mounted on the rocker arm 55 which is mounted to oscillate about the trunnion pin 56 on the threaded plug 57. Post 54 is fixed to the rocker arm 55. A lock nut 58 holds the threaded plug 57 in adjusted position. A compression spring 59 encircling the post 54 acts to swing the rocker arm 55 in a counterclockwise direction as viewed in Figure 6. A leaf spring 60 attached to the pawl 52 engages under the pawl 51 in a direction to move it radially outwardly.

Figure 9:
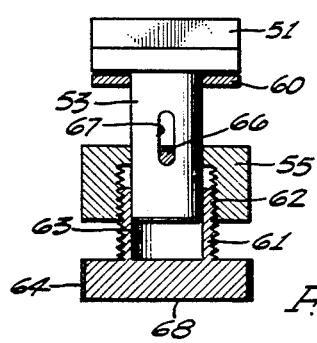
Figure 9 is a sectional detail taken substantially on the lines 9—9 as shown in Figure 6.
Figure 11:
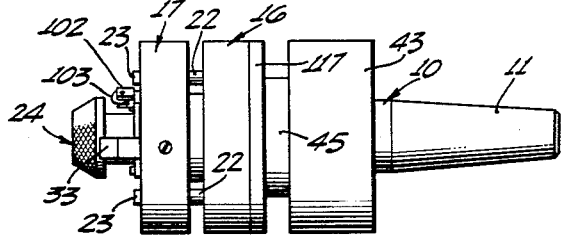
Figure 11 is a side elevation of the device shown in Figure 2.

As shown in Figure 9, an adjusting screw 61 is connected to the rocker arm 55 by thread 62 and is provided with a central opening 63 for sliding reception of the post 53. The outer surface 64 of the adjusting screw 61 is provided with a plurality of slots or grooves for reception of the latch element 65 which is mounted on the rocker arm 55 by means of the set screw 66. One end of this set screw 66 projects into an axial slot 67 formed on the post 53 and serves to limit the extent of travel of the post 53 with respect to the rocker arm 55. The lower surface 68 of the adjusting screw 61 is engaged by the radially reciprocating pin 69. When the pin 69 is in the upper position shown in Figure 6, the pawl 51 is engaged with the teeth of the ratchet 48. When the pin 69 moves downward, the spring 59 swings the rocker arm 55 in a counterclockwise direction as viewed in Figure 6, thereby causing the set screw 66 acting in slot 67 to retract the pawl 51 away from the ratchet teeth 49. The large torsion spring 40 then causes the nut 45 to move in the direction of the arrow 70 until the pawl 52 engages the ratchet teeth 49. The feed nut 45 thus advances one-half notch for each one-half revolution of the shaft 72.

Means are provided for reciprocating the pin 69 in accordance with rotation of the live center assembly 24. As shown in the drawings, this means includes a timing shaft 72 which is mounted to turn within the central axial bore 73 of the shank portion 12. This shaft is driven by the one-way clutch assembly generally designated 74 and contained within sleeve 27. As best shown in Figure 3 this one-way clutch assembly 74 includes a flange 75 fixed to the shaft 72 and an opposed flange 76 fixed on the threaded plug 77. A washer 78 interposed between the flanges 75 and 76 is provided with laterally offset end portions 79. The construction is such that the washer serves as a driving connection for one direction of rotation only. The flange 76 turns with the sleeve 27 and the center element 25 and the flange 75 is driven whenever the direction of rotation of the work piece "W" is correct with regard to the cutting edges of the bits 33.

The shaft 72 is provided with a pair of eccentric portions 80 and 81. These eccentric portions are engaged by pins 82 and 83 which reciprocate within radial bores provided on the shank portion 12. A tilt bar 84 is mounted within a recess 85 on the shank portion 12 and is engaged on its outer surface by the drive pin 69 and on its inner surface by the pins 82 and 83. As the pin 69 moves axially with the collar 16 toward the work piece "W," it moves along the length of the bar 84. The bar 84 reciprocates radially under action of the pins 82 and 83, and therefore, the pin 69 is reciprocated radially regardless of its axial position at any location within this range of operation.

In order to facilitate retraction of the nut 45 to its initial position on the threads 46 of the shank 10, I prefer to provide means for releasing the ratchet ring 48 from its connection with the feed nut 45. As shown in the drawings, this means includes ratchet lugs 86 engaging ratchet teeth 87 formed on the rear face of the ring 48. Coil springs 88 act to move the ratchet lugs 86 toward locking position. When the ratchet ring 48 moves in the direction of the arrow 89 as shown in Figure 10, the elements 86 reciprocate axially against the springs 88. This action permits the nut 45 to turn in a retracting direction on the threads 46 while the ring 48 remains stationary.

Figure 4:
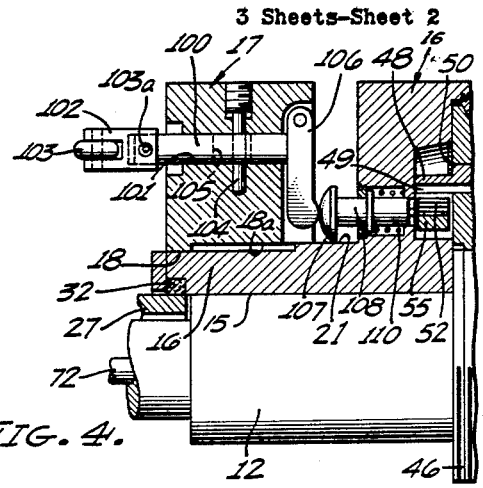
Figure 4 is a sectional view partly broken away taken substantially on the lines 4—4 as shown in Figure 1.
Figure 6:
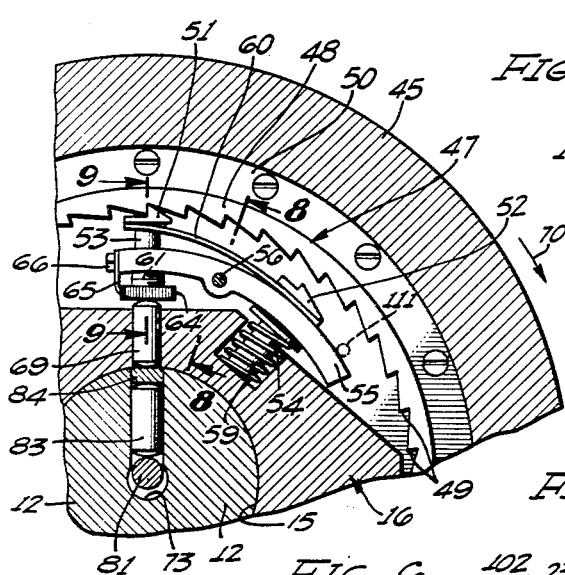
Figure 6 is a fragmentary sectional view taken substantially on the lines 6—6 as shown in Figure 2.
Figure 7:
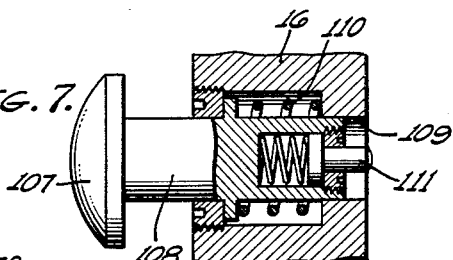
Figure 7 is a sectional detail showing an enlargement of a portion of Figure 4.
Figure 8:
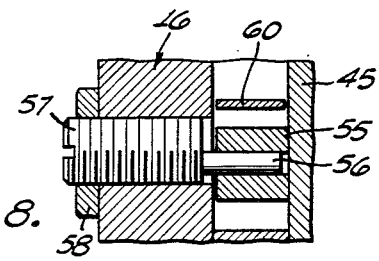
Figure 8 is a sectional detail taken substantially on the lines 8—8 shown in Figure 6.

Trigger means are provided for interrupting the action of the escapement mechanism 47 when the cutter bits 33 have entered the work piece "W" to the extent desired. As shown in Figure 4, a plunger 100 is slidably mounted for axial movement within a bore 101 provided in the ring 17. The plunger 100 carries a clevis 102 and a small roller 103 on its extending end. A cross pin 104 extending through a post 105 in the plunger limits the extent of axial travel thereof. The rear end of the plunger engages the pivoted lever 106 and the swinging end of this lever engages the head 107 of the stop plunger 108. As shown in Figure 7 the stop plunger 108 is mounted to move axially in a bore 109 provided on the hub 16. A coil spring 110 acts to move the plunger 108 toward the left as viewed in Figure 7. A spring-urged trigger 111 is mounted on the stop plunger 108 and this trigger is adapted to interrupt the rocking action of the member 55 when the trigger 111 is projected. In its projected position, the trigger 111 occupies the phantom line position shown in Figure 6, and serves to hold the pawl 51 in engagement with the ratchet ring 48. From this description it will be understood that contact of the roller 103 with the work piece "W" causes the plunger 100 to actuate the lever 106 and cause the stop plunger to project the trigger 111 to the path of movement of the rocker arm 55, thus interrupting the action of the escapement mechanism 47 and preventing further feeding movement of the nut 45. The set screw 103a (Figure 4) allows axial adjustment of the roller 103 which determines depth of the cut.

In the operation of that form of my invention shown in Figures 1–11, inclusive, the tapered end 11 of the shank 10 is supported in the tail stock of the lathe, for example. In such case the shank 10 is held against rotation, while power is applied by the lathe to turn the work piece "W" in a conventional manner. The tail stock (not shown) is advanced axially to bring the live center assembly 24 into engagement with the work piece "W." Turning of the center element 25 acts through the one-way clutch assembly 74 to rotate the shaft 72 within the shank portion 12. This rotation causes the pins 82 and 83 to reciprocate radially, carrying the bar 84 with them. Pin 69 reciprocates thereby causing the rocker arm 55 to oscillate about its supporting trunnion 56. This action moves the pawls 51 and 52 alternately into and out of engagement with the teeth 49 on the ratchet ring 48, thus permitting the feed nut 45 to be advanced one-half notch at a time under torque supplied by the torsion spring 40. The cutter bits 33 engage the work and cut a circular groove. When the groove has reached the proper depth, the small wheel 103 engages a side face of the work and causes the plunger 100 to act through the pivoted lever 106 and stop plunger 108 to move the trigger 111 into position to interrupt action of the escapement mechanism 47. This action stops the feed of the cutter bit 33 toward the work piece "W." The cutting operation of the cutter bit 33 is continuous, inasmuch as the cutter is fixed and the work rotates continuously. The feed, however, is intermittent, inasmuch as the feed advances one-half notch for each rotation of the live center.

The tail stock is then retracted to move the shank 10 and associated mechanism away from the work piece. If another size or diameter of groove is required, the ring 17 is dismantled from the assembly by disconnecting the threaded elements 23 and sliding it axially over the sleeve 27. Another ring (not shown) similar to the ring 17 and carrying cutter bits positioned to cut the desired groove, is then installed by passing it over the live center assembly 27 and securing it to the threaded bosses 22 by means of the threaded elements 23. It is not necessary to dismantle the live center assembly 24, other than to remove the element 25 in order to substitute bit-carrying rings 17. Element 25 is changed for different size holes in the work.

Advancing movement of the nut 45 on the threads 46 causes the forward face 115 on the nut to engage the opposed face 116 on the hub 16. When it is desired to return the nut to its initial position, the shell 43 is turned in the direction to wind up the spring 40. A threaded ring 117 on the hub 16 has a surface 118 which is engaged by the nut 45 to retract the collar 16 and ring 117 to the initial position. The sequence of operations may then be repeated.

When it is necessary or desirable to remove the center element 25 from the supporting sleeve 27, element 25 is turned in a reverse direction relative to the sleeve 27. The pin 28 rides up an inclined groove 28a extending circumferentially on the sleeve 27, and out from under the retainer spring 120. The cam lever 121 may then be actuated to apply a force against the threaded plug 77 and thereby remove the center element 25 axially from the sleeve 27. The one-way clutch assembly 74 makes it possible to turn the work piece "W" in the opposite direction when desired without causing the cutter bits 33 to move axially.

Figure 12:
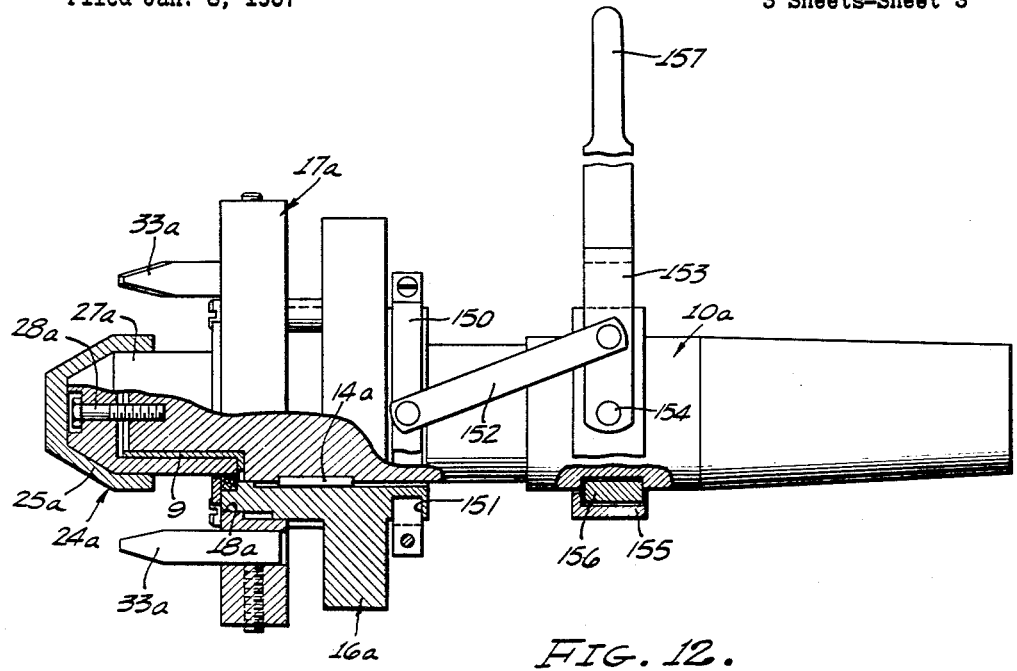
Figure 12 is a side elevation partly in section showing a modification.

In the modified form of my invention shown in Figure 12, the shank 10a carries a center assembly 24a and rotary center element 25a at its forward end. A threaded element 28a retains the sleeve 27a in position but permits it to turn freely on bearing 9. The ring 17a carries cutter bits 33a and is releasably mounted on the hub of the collar 16a in substantially the same manner as described above. The collar 16a is keyed to the shank 10a at 14a. The minimum diameter bore 18a in the ring 17a is larger than the maximum diameter of the sleeve 27a so that the ring 17a may be removed and replaced.

Instead of the automatic, spring driven feed device and escapement mechanism previously described, this form of my invention uses a manual feed device. A split collar 150 is mounted in the groove 151 provided on the collar 16a and this split collar 150 is connected by links 152 to a yoke 153 which is pivotly mounted by pins 154 on a ring 155. A thrust ring 156 is interposed between the collar 155 and the shank 10a. A manual lever 157 is mounted on the yoke 153 and when this lever is moved in a counterclockwise direction as viewed in Figure 12 the links 152 move the collar 16a and the ring 17a axially to the left, to engage the bits 33a with the work. Movement of the manual lever 157 in a clockwise direction serves to retract the members 16a and 17a. The shank 10a can be mounted on the tail stock of a lathe or in the spindle of a drill press as described above.

Figure 13:
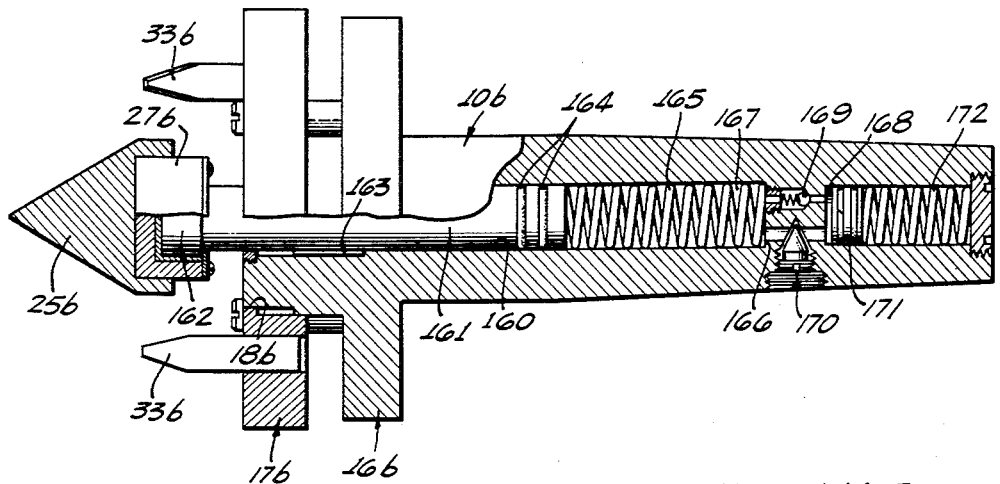
Figure 13 is a side elevation partly in section showing a further modification.

In the modified form of my invention shown in Figure 13, the shank 10b is provided with an axial bore 160 for reception of the plunger 161. The plunger 161 is enlarged at its forward end 162 and the rotary sleeve 27b and center element 25b is mounted on this enlargement. A key 163 permits relative axial movement between the plunger 161 and the shank 10b but prevents relative rotary movement therebetween. The collar 16b is formed integrally as a part of the shank 10b and is provided with a hub on which the ring 17b is detachably mounted. Cutters 33b are mounted on the ring 17b in the manner described above. The minimum diameter of the bore 18b of the ring 17b is larger than the maximum diameter of the sleeve 27b so that the ring 17b may be installed and replaced without dismantling the center element 25b.

A plunger 161 is provided with seal rings 164 which engage the bore 160. A compression spring 165 is mounted within the bore 160. One end of the spring contacts the plunger 161 and the other end of the spring engages a shoulder 166 on the shank 10b. An adjustable dash pot action is achieved in one direction by providing a pair of passages which communicate between the chambers 167 and 168. The first of these passages contains a check valve 169 which permits flow into the chamber 167, but which prevents return flow. The second of these passages contains an adjustable needle valve 170 which serves to throttle the flow in both directions. Oil is placed in the chamber 167, and when the plunger 161 moves in a direction to compress the spring 165, oil is forced to flow through the passage containing the needle valve 170 and into the chamber 168. This action serves to move the piston 171 in the direction to compress the spring 172. When the plunger 161 moves in a direction to expand the coil spring 165, oil flows from the chamber 168 to the chamber 167 through both of the passageways. Accordingly the dash pot action provided is such that advancing movement of the bits 33b toward the work is slower than retracting movement thereof.

The shank 10b is adapted to be received within the tail stock of the lathe or within the spindle of a drill press as described above but in this case the axial feed operation is effected by means of such tail stock or spindle. The cutter bits 33b and their carrier ring 17b move as a unit with the shank 10b and do not move relative to it. The dash pot and spring action provided prevents too rapid advancing movement of the cutter bits 33b toward the work.

Having fully described my invention, it is to be understood that I do not wish to be limited to the details herein set forth, but my invention is of the full scope of the appended claims.

I claim:

1. In a groove-cutting device of the type described, the combination of: a supporting shank, a center element rotatably mounted at one end of the shank and adapted to engage a work piece, a feed collar non-rotatably mounted upon the shank for axial sliding movement, a tool carrier ring, detachable means mounting the tool carrier ring upon the feed collar, the tool carrier ring having a central opening larger than the outside dimensions of the center element to permit axial removal of the tool carrier ring over the center element, a nut threadedly mounted upon the shank and engaging the feed collar, resilient means acting to turn the nut in a direction to move the feed collar axially toward the work piece, and means actuated by turning movement of the center element for regulating the rate of turning of the nut.

2. The combination set forth in claim 1 wherein the latter said means includes a ratchet ring and an escapement mechanism having a pair of pawls alternately engaging said ratchet ring.

3. In a groove-cutting device of the type described, the combination of: a supporting shank, a center element rotatably mounted at one end of the shank and adapted to engage a work piece, a feed collar non-rotatably mounted upon the shank for axial sliding movement, a tool carrier ring, detachable means mounting the tool carrier ring upon the feed collar, the tool carrier ring having a central opening larger than the outside dimensions of the center element to permit axial removal of the tool carrier ring over the center element, a nut threadedly mounted upon the shank and engaging the feed collar, resilient means acting to turn the nut in a direction to move the feed collar axially toward the work piece, means for regulating the turning movement of the nut including an escapement mechanism having a pair of pawls mounted upon a rocker arm, a ratchet ring on the nut, and means actuated by turning movement of the center element for oscillating the rocker arm to cause the pawls alternately to engage the ratchet ring.

4. In a groove-cutting device of the type described, the combination of: a supporting shank, a center element rotatably mounted at one end of the shank and adapted to engage a work piece, a feed collar non-rotatably mounted upon the shank for axial sliding movement, a tool carrier ring, detachable means mounting the tool carrier ring upon the feed collar, the tool carrier ring having a central opening larger than the outside dimensions of the center element to permit axial removal of the tool carrier ring over the center element, a nut threadedly mounted upon the shank and engaging the feed collar, resilient means acting to turn the nut in a direction to move the feed collar axially toward the work piece, and means to interrupt turning movement of the nut, including an element on the feed collar adapted to contact the work piece upon predetermined axial travel of the tool carrier ring.

5. In a groove-cutting device of the type described, the combination of: a supporting shank, a center element rotatably mounted at one end of the shank and adapted to engage a work piece, a feed collar non-rotatably mounted upon the shank for axial sliding movement, a tool carrier ring, detachable means mounting the tool carrier ring upon the feed collar, the tool carrier ring having a central opening larger than the outside dimensions of the center element to permit axial removal of the tool carrier ring over the center element, a nut threadedly mounted upon the shank and engaging the feed collar, resilient means acting to turn the nut in a direction to move the feed collar axially toward the work piece, means for regulating the turning movement of the nut including an escapement mechanism having a pair of pawls mounted upon a rocker arm, a ratchet ring on the nut adapted to be alternately engaged by the pawls, and means for interrupting the action of the escapement mechanism when the feed collar has moved axially to a predetermined position.

6. A cutting tool mounting and feed mechanism, comprising: a supporting structure; a workpiece engageable member mounted on said supporting structure, said member adapted to be fixed relative to said workpiece, said member and supporting structure being relatively rotatable; a tool-holder axially slidable upon but non-rotatable relative to said supporting structure for movement to and from a workpiece engaged by said members; a work-engaging tool carried by said tool-holder; a feed nut screwthreaded on and rotatable relative to said supporting structure, said feed nut being connected with said tool-holder to advance and retract said tool relative to said workpiece; a torsion motor connected with said nut and tending to rotate said feed nut in a direction to move said tool-holder and tool toward said workpiece; and intermittent feed advancing mechanism including means operated by said workpiece engageable member for controlling advancing movement of said feed nut, tool-holder, and tool.

7. A cutting tool mounting and feed mechanism, comprising: a supporting structure; a workpiece engageable member mounted on said supporting structure, said member adapted to be fixed relative to said workpiece, said member and supporting structure being relatively rotatable; a tool-holder axially slidable upon but non-rotatable relative to said supporting structure for movement to and from a workpiece engaged by said member; a work-engaging tool carried by said tool-holder; a feed nut screwthreaded on and rotatable relative to said supporting structure, said feed nut being connected with said tool-holder to advance and retract said tool relative to said workpiece; a torsion motor connected with said nut and tending to rotate said feed nut in a direction to move said tool-holder and tool toward said workpiece; and an intermittent feed advancing mechanism including ratchet and pawl means interposed between said feed nut and tool-holder; and operating means for said ratchet and pawl means connected with said workpiece engaging member.

8. A cutting tool mounting and feed mechanism, comprising: a supporting structure; a workpiece engageable member mounted on said supporting structure, said member adapted to be fixed relative to said workpiece, said member and supporting structure being relatively rotatable; a hool-holder axially slidable upon but non-rotatable relative to said supporting structure for movement to and from a workpiece engaged by said member; a work-engaging tool carried by said tool-holder; a feed nut screwthreaded on and rotatable relative to said supporting structure, said feed nut being connected with said tool-holder to advance and retract said tool relative to said workpiece; a torsion motor connected with said nut and tending to rotate said feed nut in a direction to move said tool-holder and tool toward said workpiece; an intermittent feed advancing mechanism including ratchet and pawl means interposed between said feed nut and tool-holder, and operating means for said ratchet and pawl means connected with said workpiece engaging member; clutch means between said feed advancing mechanism to permit backing of said feed nut; and manually engageable means for energizing said torsion motor and backing said feed nut.

References Cited in the file of this patent

UNITED STATES PATENTS

| Number | Name | Date |
|---|---|---|
| 58,924 | Webster | Oct. 16, 1866 |
| 308,842 | Hunt | Dec. 2, 1884 |
| 739,501 | Meyers | Sept. 22, 1903 |
| 1,102,538 | Mulligan | July 7, 1914 |
| 1,285,350 | Palmgren | Nov. 19, 1918 |
| 1,805,964 | Wallis | May 19, 1931 |
| 2,192,528 | Schmidt | Mar. 5, 1940 |
| 2,460,000 | Flanagan | Jan. 25, 1949 |